United States Patent [19]

Hubner

[11] 3,854,078
[45] Dec. 10, 1974

[54] COMMUTATORLESS MOTOR ARRANGEMENT

[75] Inventor: Klaus Hubner, Erlangen, Germany

[73] Assignee: Siemens Aktiengesellschaft, Munich, Germany

[22] Filed: Apr. 18, 1973

[21] Appl. No.: 352,204

[30] Foreign Application Priority Data
Apr. 19, 1972 Germany............................ 2219018

[52] U.S. Cl......................... 318/227, 321/4, 321/10
[51] Int. Cl. ............................................. H02p 5/40
[58] Field of Search............ 321/2, 5, 45 R, 45 C, 4, 321/10; 318/227

[56] References Cited
UNITED STATES PATENTS

| | | | |
|---|---|---|---|
| 3,379,955 | 4/1968 | Koetsch | 321/45 C |
| 3,430,123 | 2/1969 | Corry et al. | 321/4 |
| 3,500,170 | 3/1970 | Charrin et al. | 321/45 |
| 3,525,100 | 8/1970 | Duff | 321/45 C |
| 3,568,021 | 3/1971 | Turnbull | 321/45 C X |
| 3,593,103 | 7/1971 | Chandler et al. | 321/5 X |
| 3,652,874 | 3/1972 | Partridge | 321/45 C |
| 3,696,278 | 10/1972 | Kuniyoshi | 318/227 |
| 3,705,341 | 12/1972 | Frank | 321/45 C X |
| 3,716,775 | 2/1973 | Skogsholm | 321/2 X |
| 3,793,573 | 2/1974 | Tsuboi | 318/227 |

Primary Examiner—William H. Beha, Jr.
Attorney, Agent, or Firm—Kenyon & Kenyon Reilly Carr & Chapin

[57] ABSTRACT

A commutatorless motor arrangement includes a commutatorless motor and an inverter connected to the motor for commutating the same. A direct current intermediate circuit is connected between a supply and the inverter and has a smoothing reactor across which self-induced voltage appears in response to a reduction of current in the intermediate circuit. A series circuit containing a controllable rectifying component in series with an uncontrollable rectifying component is connected in parallel with the smoothing reactor. A capacitor is connected at the junction of the rectifying components to form a series circuit path with the uncontrolled rectifying component across the output of the intermediate circuit. With this arrangement the motor is commutated with few components also at motor speeds which differ only slightly from zero.

2 Claims, 2 Drawing Figures

3,854,078

COMMUTATORLESS MOTOR ARRANGEMENT

BACKGROUND OF THE INVENTION

The invention relates to a commutatorless motor which is supplied through an inverter with a direct current intermediate circuit. The intermediate circuit includes a smoothing inductance and a controllable rectifier component connected in parallel therewith; this component is poled so that the self-induced voltage which appears at the smoothing inductance when the current drops is applied to the rectifier component in the forward conducting direction thereof.

Commutatorless motors are generally understood to be rotating-field machines of the synchronous type which are supplied from a single-phase or three-phase alternating current system of constant voltage and frequency via a controlled rectifier, a direct current intermediate circuit and an inverter. The inverter is timed in dependence on the load and the reactive commutation power is supplied by the machine.

In a commutatorless motor the reactive power for the commutation of the motor current can be made available by the motor itself only above a certain operating speed. In a speed range which is between zero and about one-tenth of the rated speed of the commutatorless motor, recourse must therefore be had to separate starting means wherein the range of low speeds is traversed with aid of supplemental devices or appropriate switching.

German Pat. No. 639,322 for example discloses that the current in the direct current intermediate circuit can be made zero in the range of low motor speeds corresponding to a slow commutation sequence of the inverter shortly before each phase change of the rotating-field machine by means of appropriate control of the rectifier, whereby the controllable rectifier components of the inverter recover their cut-off ability and can subsequently be turned-on again at the desired phase. In this commutatorless motor the attainable commutation frequency is, however relatively low, and among other things, it is limited by the natural dead time of the system-controlled rectifier.

From Siemens Zeitschrift, Vol. 45, p 186 to 188 (1971) or *IEEE Transactions on Industry and General Applications*, Vol. IGA-7, No. 4, p. 539 to 543 (1971), for example, a commutatorless motor of the kind mentioned above is shown wherein the motor current is commutated by means of a controlled rectifying component which is connected anti-parallel to the reactor of the directcurrent intermediate circuit so that the reactor current can continue to flow unimpeded during commutation and only the motor current above the a-c component of the rectifier output voltage must be commutated. This has the disadvantage that in addition to the stray reactances of the motor, the inductances of the line feed, including the stray reactance of the feed transformer, strongly affect the magnitude of the commutatable current.

BRIEF SUMMARY OF THE INVENTION

It is an object of the invention to provide a commutatorless motor arrangement wherein the motor current is commutated with a minimum in components also at low operating speed.

The commutatorless motor arrangement according to the invention includes a commutatorless motor and an inverter connected to the motor for commutating the same. A direct current intermediate circuit is connected between a supply and the inverter and includes a smoothing reactor across which a self-induced voltage appears in response to a reduction of the current in the intermediate circuit. A controllable rectifying component is connected in parallel with the smoothing reactor and poled with respect to the reactor so as to cause the self-induced voltage to be applied across the rectifying component in the forward direction thereof. Also part of the intermediate circuit is a series circuit connected across the output thereof. The series circuit includes an uncontrolled rectifying component, and a capacitor serially connected to the uncontrolled rectifying component. The uncontrolled rectifying component is also connected to the controlled rectifying component so as to conjointly define therewith a series circuit path in parallel with the reactor.

In the commutatorless motor according to the invention, the maximum motor current is commutated with the aid of the harmonic voltage of the line rectifier even at operating speeds which differ only slightly from zero. The current is commutated down first in the feed line and only then in the motor, the current being again commutated up in the same sequence. The commutation process of the motor current takes place very rapidly and the resulting current-free or torque free interval in the motor can be kept very small. The current in the smoothing inductance continues to flow unimpeded with approximately constant magnitude during the entire commutation, and the commutatable current is practically independent of the inductance of the feeding three-phase system. From the time-sequential commutation of the line and the motor current, two separate commutation circuits result; each circuit obtains a commutation voltage of sufficient magnitude through a capacitor charge reversal resulting from a reversal process in the other commutation circuit.

Although the invention is illustrated and described herein as a commutatorless motor arrangement, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
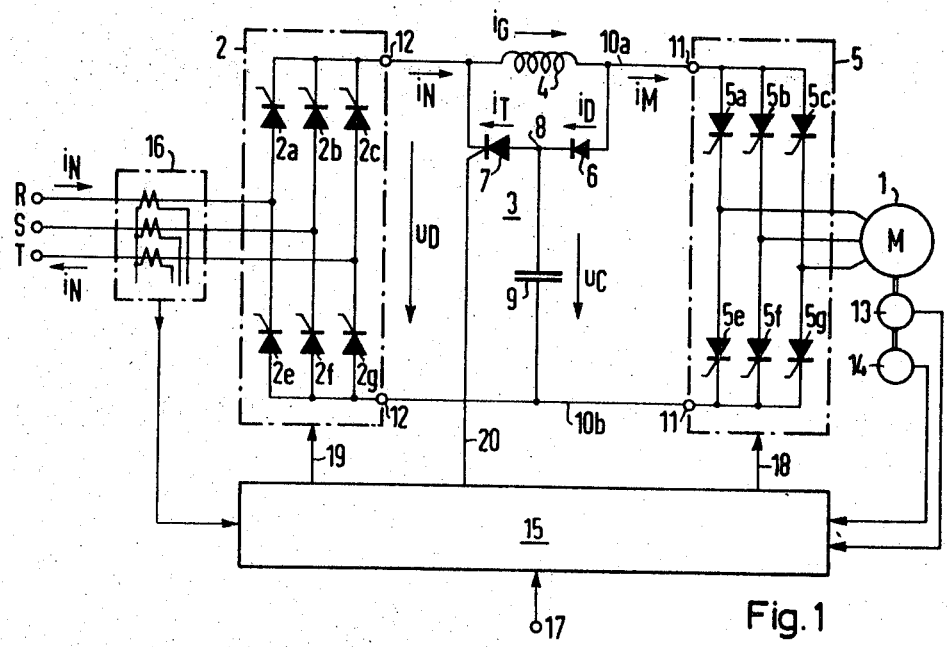
FIG. 1 is a schematic circuit diagram of the commutatorless motor arrangement according to the invention.

FIG. 1 shows the circuit of a commutatorless motor arrangement according to the invention. The three-phase winding of a synchronous machine 1 is fed from a three-phase system R, S, T through a controlled rectifier 2, a direct-current intermediate circuit having a smoothing inductance 4 and a controlled inverter 5. In the illustrated embodiment, the rectifier 2 is built up of six controlled rectifying components 2a to 2g in a bridge circuit, and the inverter 5 of controlled rectifying components 5a to 5g, likewise in a bridge circuit.

The controlled rectifying components 2a to 2g and 5a to 5g can be thyristors for example.

The smoothing choke 4 is arranged in one bus bar 10a of the intermediate circuit 3 and is shunted by the series circuit consisting of an uncontrolled rectifying component 6 and a controlled rectifying component 7. For example, the rectifying components 6 and 7 can be a diode and a thyristor respectively. The polarity of the diode 6 and the thyristor 7 is chosen so that the self-induced voltage appearing at the smoothing inductance 4 when direct current is reduced or switched off in the intermediate circuit 3 is applied to the components 6 and 7 in the direction of conduction, and so that the current flowing through the choke 4 can continue to flow through the diode 6 and the turned-on thyristor 7. The circuit node 8 joining the diode 6 and the thyristor 7 is connected through a capacitor 9 to the second bus bar 10b of the intermediate circuit 3. Thus, the series circuit consisting of the diode 6 and the capacitor 9 bridges the output 11 of the intermediate circuit 3 and the series circuit consisting of the thyristor 7 and the capacitor 9 bridges the input 12 of the circuit 3.

A tachometer generator 13 and the rotor position transmitter 14 are mechanically coupled with the rotor of the three-phase synchronous motor 1. The transmitter 14 can be equipped with galvanomagnetic devices such as Hall generators for example. The signals of the tachometer generator 13 and the rotor position transmitter 14 are fed to a control unit 15. The control unit 15 also receives signals of a current transformer 16 arranged in the three-phase supply line. An rpm reference value can be fed via an input 17 to the control unit 15. The control unit 15 controls the thyristors of the inverter 5, the thyristors of the rectifier 2 and the thyristor 7 over lines 18, 19 and 20 respectively. Control units of this kind are disclosed for example in Siemens Zeitschrift Vol. 45, 1971, pages 186 to 188 and in *IEEE Transactions on Industry and General Applications*, Vol. IGA-7, No. 4, 1971, pages 539 to 543.

At operating rpms which are greater than about one-tenth of the rated rpm, the motor current $i_M$ is commutated, for example, from the thyristor 5a to the thyristor 5b of the inverter 5 by means of the machine voltage of the capacitively controlled synchronous machine 1.

At operating speeds which are smaller than about one-tenth of the rated rpm, however, the machine voltage is not sufficient, so that the motor current $i_M$ must be made zero in synchronism with the commutation frequency by means of the additive turn-off arrangement consisting of the thyristor 7, the diode 6 and the capacitor 9.

Figure 2:
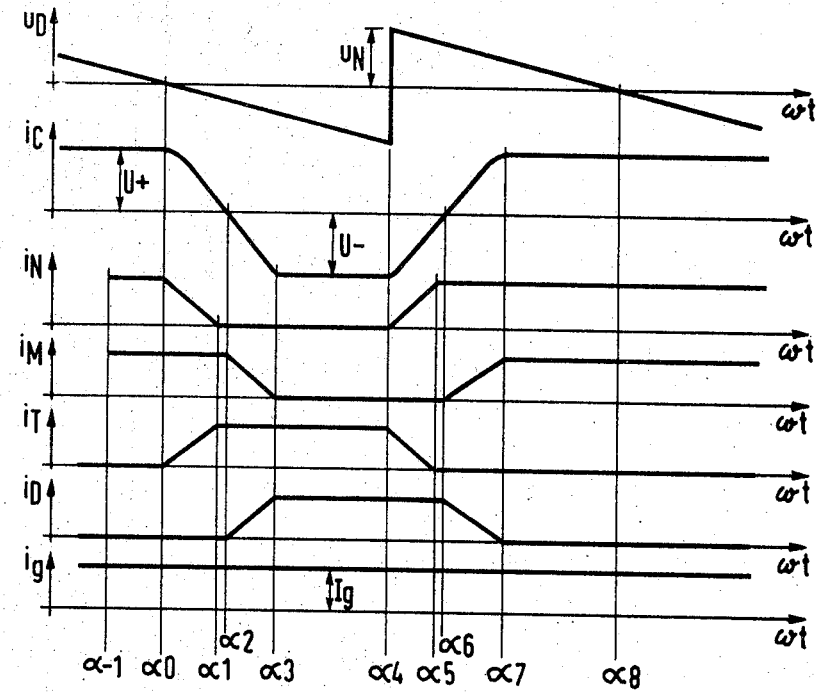
FIG. 2 illustrates the waveforms of currents at various locations in the circuit of FIG. 1.

The detailed operation of this additive turn-off arrangement will be explained with the aid of the waveform diagrams of FIG. 2. In FIG. 2, the waveforms are plotted against time and include: the intermediate circuit voltage $u_D$, the voltage $U_C$ across the capacitor, the line current $i_N$, the motor current $i_M$, the current $i_T$ through the thyristor 7, the current $i_D$ through the diode 6 and the current $i_g$ through the smoothing inductance 4. In the rpm range of interest between a rpm of approximately zero and about one-tenth of the rated rpm, the intermediate circuit voltage $u_D$ differs only little from zero and the control angle of the rectifier 2 is about 90° because $u_D$ is proportional to $n$. In the six-pulse rectifier 2, an output voltage $u_D$ is obtained which for this control angle has the shape shown in FIG. 2.

The capacitor 9 is charged to the voltage $U_+$. If a commutation, for example, from the thyristors 5a to 5g to the thyristors 5b and 5g is to take place in the inverter 5, the thyristor 7 is triggered when the voltage $u_D$ passes through zero (time $\alpha_0$ on the $\omega t$ axis of FIG. 2). The capacitor 9 is then discharged through the thyristor 7, two current-conducting thyristors of the rectifier 2 (for example thyristors 2a and 2g) and the entire inductance of the feeding system consisting of the inductance of the line choke, the inductance of the feed line as well as the stray inductance of the transformer. At the time $\alpha_1$ the current $i_T$ has reached the value of the line current $i_N$, so that the rectifying components 2a and 2g of the rectifier 2 are turned off. The direct current in the intermediate circuit is thereby switched off. The current $i_M$ is impressed by the smoothing choke 4 and is therefore initially constant; this current continues to charge the capacitor 9 in the opposite direction until the voltage $u_C$ at the capacitor 9 has become zero at the time $\alpha_2$. From now on, a countervoltage is built up on the capacitor 9, which brings the motor current $i_M$ also to zero, at the time $\alpha_3$, so that now the current-carrying rectifying components 5a and 5g of the inverter are turned off. The still constant choke current $i_g$ now flows through the diode 6 and the thyristor 7. The capacitor voltage produced because of the reverse charging retains its negative value $U_-$ until the time $\alpha_4$ when the line voltage and therewith $u_D$ return. With the rectifying components of the rectifier 2 again turned on, the line current is commutated up again by the potential difference $U_N - U_-$ which now appears; that is, the current $i_N$ increases in the same way as the current $i_T$ through the thyristor 7 decreases. $U_N$ is here the maximum instantaneous value of the intermediate circuit voltage $u_D$. At the time $\alpha_5$, the thyristor 7 is turned off; the line current $i_N$ has reached the value $I_g$ of the still constant choke current $i_g$. The current $i_g$ now continues to reverse the charge on the capacitor 9 through the diode 6. At the time $\alpha_6$, the voltage $u_C$ at the capacitor is again equal to zero and the motor current $i_M$ starts to flow again. The rectifying components 5b and 5g of the inverter, to which the current is to be commutated, must be triggered prior to the time $\alpha_6$. Generally, these rectifying components are triggered already considerably earlier by a long pulse, for example, at the time $\alpha_{-1}$, this time being before the voltage $u_D$ passes through zero. The time $(\alpha_{6/\omega} - \alpha_{3/\omega})$ corresponds to the protection time $t_s$ of the rectifying components of the inverter 5. This time interval must be observed to prevent the turned-off rectifying component 5a of the inverter 5 from turning on again.

The current $i_g$ or $i_D$ now continues to build up a positive voltage on the capacitor 9, so that with the aid of this voltage, the motor current $i_M$ is commutated up again through the turned-on thyristors 5b and 5g of the inverter. At the time $\alpha_7$ the commutation of the motor current is completed. The capacitor 9 has the voltage $U_+$ and is therefore ready for a new commutation already at the next zero crossing of the voltage $u_D$, the zero crossing being designated $\alpha_8$ in FIG. 2. The magnitude of the voltage $U_+$ on the capacitor 9 is obtained from the relation $U_+ = I_g \sqrt{L_m/C}$, where $L_m$ is the resultant commutation inductance of the motor 1 and $C$ the capacity of the capacitor 9. Because this voltage is also available for the commutation of the line current, line inductances of the order of magnitude of the motor inductance can be permitted in any case. With the usual values of $L_m$, this would mean line impedances which do not occur even with fairly long branch lines.

When the inverter is started, the capacitor 9 is charged sufficiently through the smoothing inductance 4 and the diode 6.

The reversal losses which occur in each commutation process are covered by the additional voltage-time area of the rectifier voltage $u_D$, for example, between the times $\alpha_o$ and $\alpha_1$.

The entire commutation period $\tau_K = \alpha_{7/\omega} - \alpha_{2/\omega}$ of the motor current is approximately 30° relative to the period of the supply system. Because of this very short commutation time, the torque breakdowns at the motor shaft are also extremely small.

In summary, it can be stated that in the commutatorless motor arrangement according to the invention, the line and machine current is commutated down and up again sequentially in time by an additive turn-off arrangement which serves as the starting aid. A starting aid is provided which ensures reliable commutation of the motor current also in regions of very low speeds with a minimum cost of components.

What is claimed is:

1. A commutatorless motor arrangement comprising a commutatorless motor, an inverter connected to the motor for commutating the same in response to outputs from an associated control unit, electric supply means, and a direct current intermediate circuit connected between said supply means and said inverter, said intermediate circuit including a smoothing inductance across which a self-induced voltage appears in response to a reduction of the current in said intermediate circuit, a controllable rectifying component connected in parallel with said smoothing inductance and poled with respect to said inductance so as to cause said self-induced voltage to be applied across said rectifying component in the forward conducting direction thereof, and a series circuit connected across the output of said intermediate circuit, said series circuit including an uncontrolled rectifying component, and a capacitor serially connected to said uncontrolled rectifying component, said uncontrolled rectifying component also being connected to said controlled rectifying component so as to conjointly define therewith a series circuit path in parallel with said smoothing inductance, with the control terminal of said controllable rectifier coupled to said control unit whereby said inductance, uncontrolled rectifier and controlled rectifier comprise a part of a common commutation circuit for said inverter.

2. In the commutatorless motor arrangement of claim 1, said controllable rectifying component being a thyristor, and said uncontrolled rectifying component being a diode.

* * * * *